United States Patent
Smith

(10) Patent No.: US 7,448,501 B2
(45) Date of Patent: Nov. 11, 2008

(54) CONCENTRIC C-SHAPED FILTER AND SCREEN TOPOLOGY

(75) Inventor: Kevin W. Smith, Houston, TX (US)

(73) Assignee: Total Separation Solutions, LLC, Houston, TX (US)

( * ) Notice: Subject to any disclaimer, the term of this patent is extended or adjusted under 35 U.S.C. 154(b) by 85 days.

(21) Appl. No.: 11/374,234

(22) Filed: Mar. 13, 2006

(65) Prior Publication Data

US 2006/0201873 A1 Sep. 14, 2006

Related U.S. Application Data

(60) Provisional application No. 60/662,065, filed on Mar. 14, 2005.

(51) Int. Cl.
*B01D 39/10* (2006.01)
*E03B 3/18* (2006.01)
*E03B 3/20* (2006.01)
*E21B 43/08* (2006.01)
*E21B 43/00* (2006.01)

(52) U.S. Cl. .................. 210/499; 210/497.01; 210/342; 166/227; 166/231

(58) Field of Classification Search .................. None
See application file for complete search history.

(56) References Cited

U.S. PATENT DOCUMENTS 4,657,079 A * 4/1987 Nagaoka .................. 166/231
4,818,403 A * 4/1989 Nagaoka .................. 210/488
4,943,379 A 7/1990 Boze et al.
5,190,651 A * 3/1993 Spencer et al. .............. 210/305
5,476,588 A * 12/1995 Nagaoka .................. 210/499
5,587,073 A 12/1996 Zittel
5,858,235 A 1/1999 Nagaoka
6,070,739 A 6/2000 Nagaoka
6,488,842 B2 12/2002 Nagaoka
6,514,421 B2 2/2003 Leung et al.
6,666,976 B2 12/2003 Benenson et al.
6,676,834 B1 1/2004 Benenson et al.
6,698,595 B2 * 3/2004 Norell et al. .............. 210/499
6,705,049 B2 3/2004 Esmond et al.
6,821,444 B2 11/2004 Benenson et al.

* cited by examiner

*Primary Examiner*—Krishnan S Menon
*Assistant Examiner*—Madeline Gonzalez
(74) *Attorney, Agent, or Firm*—William L. Krayer

(57) ABSTRACT

A screen for separating solids and liquids is formed from parallel strips of wedge wire or similar material into a substantially cylindrical two-sided enclosure in a generally C-shaped profile. Unfiltered liquid containing solids contacts the screen surface on both the convex and concave sides of the C-shaped enclosure. The unit may be placed in a vessel adapted to accommodate two such C-shaped devices in concentric relationship. The vessel may function similar to a candle filter, or a more conventional flow may be used.

7 Claims, 6 Drawing Sheets

CONCENTRIC C-SHAPED FILTER AND SCREEN TOPOLOGY

RELATED APPLICATION

This application claims the full benefit of Provisional Application 60/662,065 filed Mar. 14, 2005.

FIELD OF THE INVENTION

Filter or screen material having convex and concave filtering surfaces are formed into an enclosure that will fit into a generally cylindrical housing, preferably accommodating at least one additional such enclosure within the space defined by its concave surface. High throughputs and separation efficiency are obtained.

BACKGROUND OF THE INVENTION

Good screening and filter throughput is desirable for many high volume fluid handling operations, such as filtering and screening of well completion and workover fluids, but has been difficult to sustain in the varied and generally hostile conditions of many well drilling and producing operations. Backwashing is also sometimes inefficient because of the design of the solids separation device.

SUMMARY OF THE INVENTION

I have developed a new design for a filter or screen which overcomes to a large degree the difficulties recited in the background of the invention, namely the invention provides a sustainable throughput for large volumes of fluid, and the ability efficiently to backwash

DETAILED DESCRIPTION OF THE INVENTION

My invention is illustrated in terms of a wedge wire screen, but the C-shape enclosure to be described below is applicable to other types of screens and to filters, as will be explained.

Figure 1:
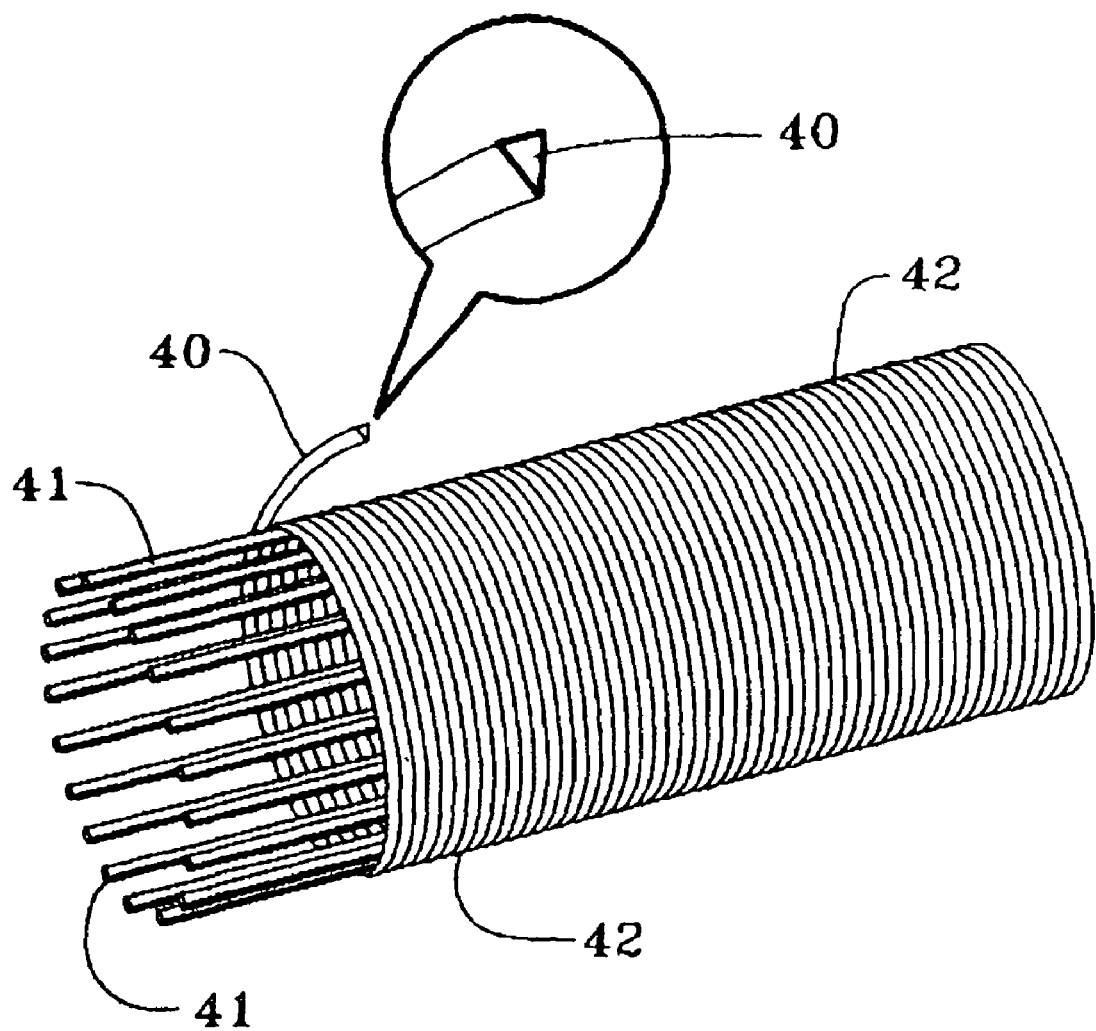
FIG. 1 illustrates a prior art technique for manufacturing a cylindrical wedge wire screen.

FIG. 1 is a detail of the construction of a wedge wire screen useful in my invention, which can be placed in various positions in the system. As is known in the art, a screen can be made by winding a wedge wire 40, an extruded, triangular section wire, around a cage of parallel ribs 41, fixing them to form a space or slot 42 of a desired opening dimension between them, usually by welding.

Figure 2:
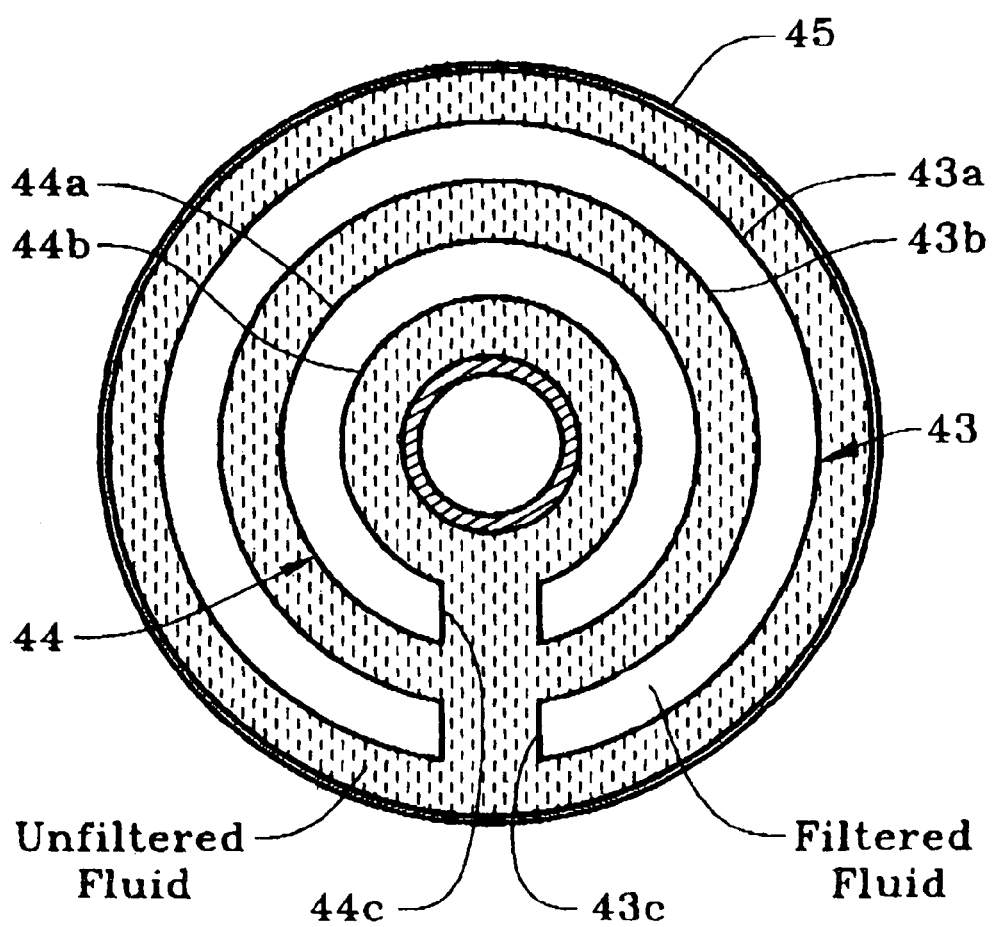
FIG. 2 is a simplified section of a cylindrical two-section concentric screen of my invention.
Figure 4:
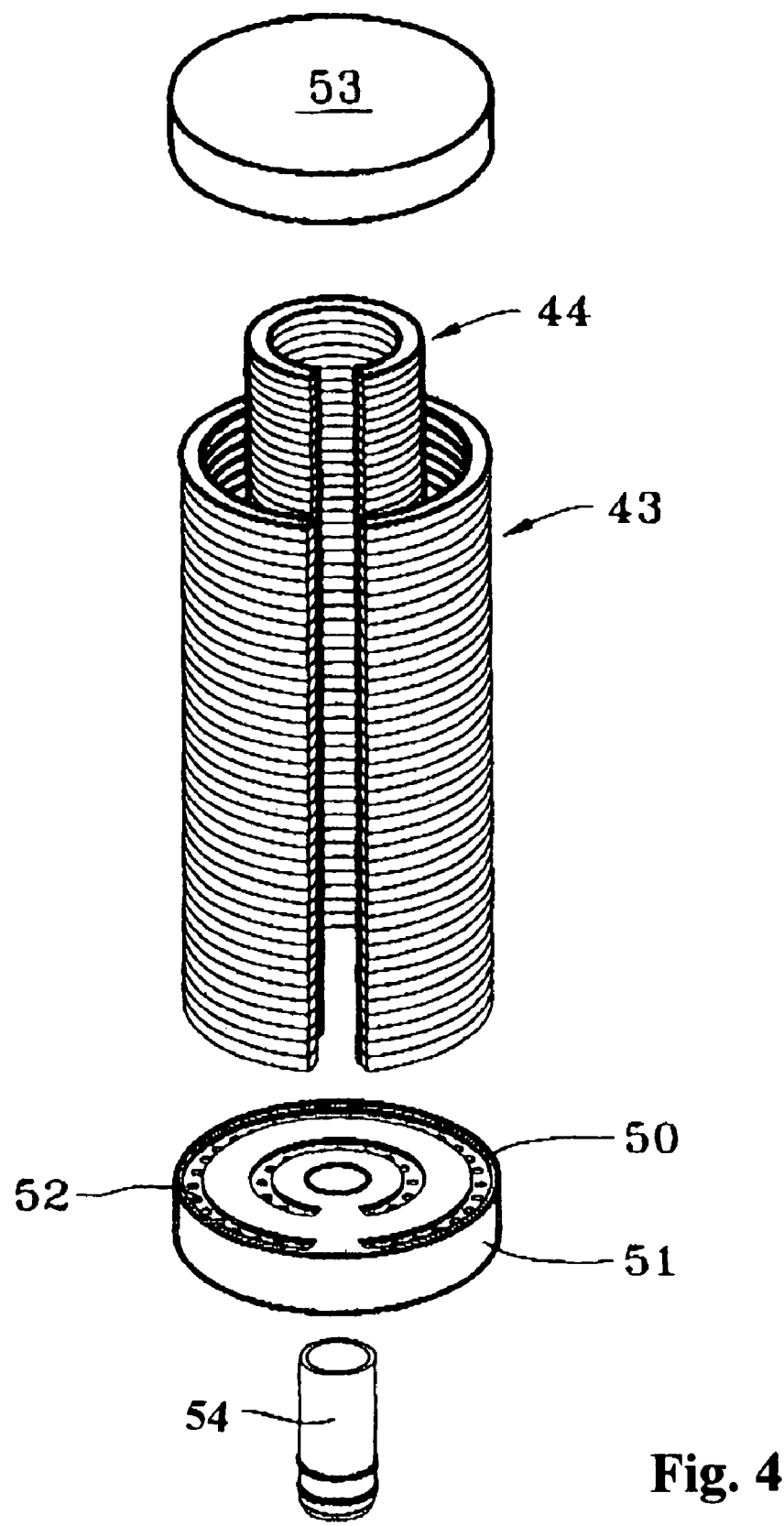
FIG. 4 is an "exploded" view of my screen device, including the end units.
Figure 5:
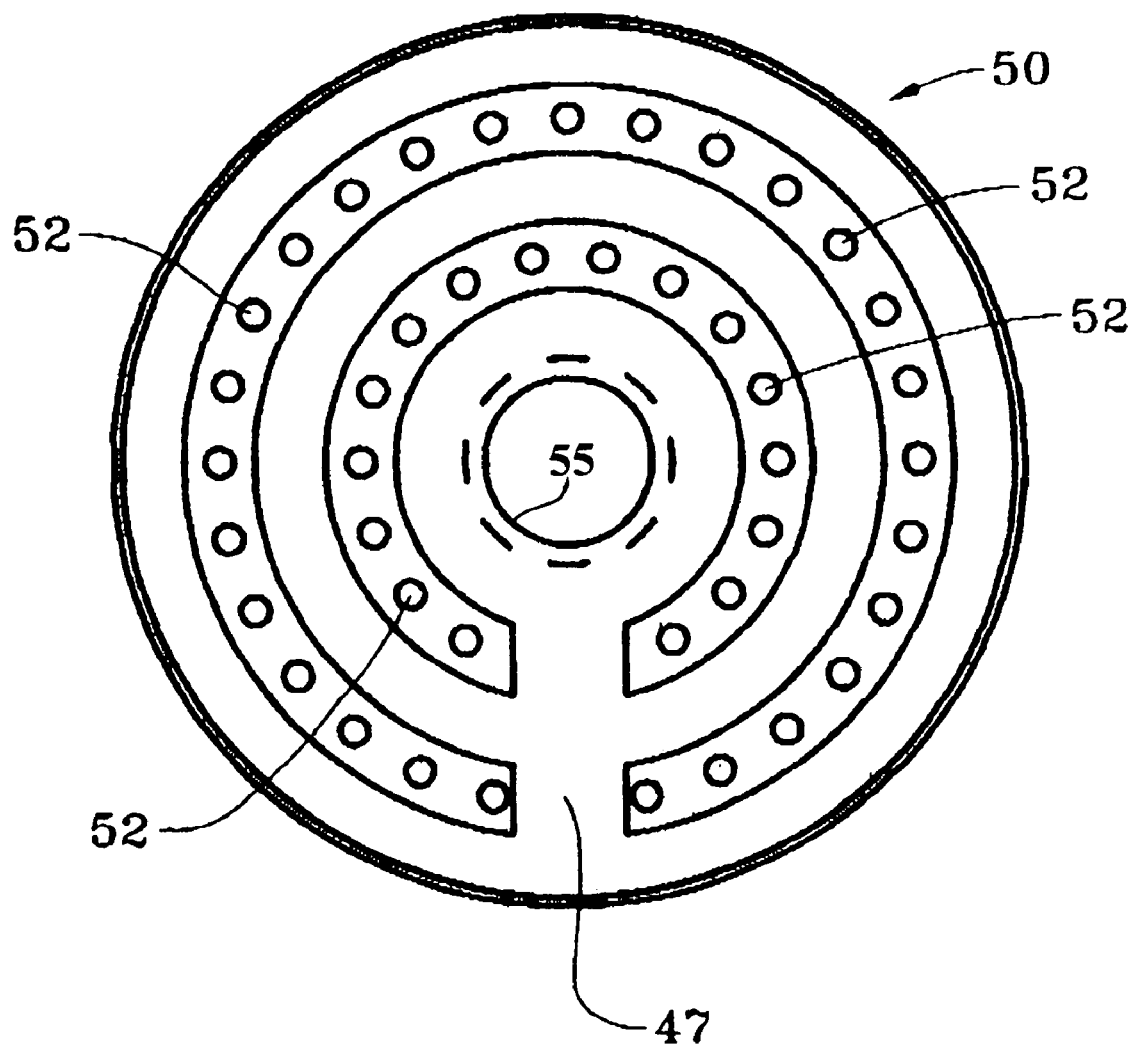
FIG. 5 is an overhead view of the top plate of the reservoir which facilitates collection of the filtered fluid.

FIG. 2 is a simplified sectional view of the construction of a substantially cylindrical filter or wedge wire screen of my invention. Here, there are two C-shaped screen units 43 and 44 set substantially concentrically in a cylindrical housing 45. Each screen unit 43 and 44 has a convex face 43a and 44a, and a concave face 43b and 44b, both of which are to be contacted by unfiltered fluid, represented here by the shaded areas. Each screen unit 43 and 44 also has end caps 43c and 44c, which may be impervious—that is, it need not be of wedge wire or other screen material. Together with the concave and convex faces, and, together with the fact that I seal the C-shaped units at the top and bottom, the end caps form an enclosure. Unfiltered fluid enters the cylindrical housing 45 through inlets not shown (from anywhere through the housing 45, or its top, provided it passes into a portion of the shaded area labeled "unfiltered fluid) and passes through the separator media (such as wedge wire screens) of both the convex and concave sides of the screen units, leaving solids of the undesired size behind. Filtered or screened fluid within the screen units may then be removed through outlets 52 as illustrated in FIGS. 4 and 5. It should be noted that both the convex faces 43a and 44a, and the concave faces 43b and 44b of the screen units are constructed so that, if they are made of wedge wire, the flat side of the wedge wire contacts the unfiltered fluid. One of the features of wedge wire screens is that a solid particle is not likely to become lodged in a slot 42 because the anterior of the slot is divergent, i.e. the slot is between two triangular shapes opening to the interior of the filter surface. Thus the construction of the concave faces 43b and 44b is opposite the convex orientation shown in FIG. 1, the wedge wire being laid on the inside of ribs 41 rather than the outside; nevertheless, the unfiltered fluid contacts only flat surfaces defining the slots 42 (FIG. 1). A generally C-shaped face 43a or 43b can be made by making a longitudinal cut in the wedge wire screen of FIG. 1. A concave filter or screen surface may be made by bending a cylindrical surface such as that made in FIG. 1 so that the flat surfaces face inwardly. Of course, "sheets" of wedge wire screen can be made by welding or otherwise fixing precut lengths of wedge wire to parallel ribs on a plane or flat surface and then bending them to the desired form.

Figure 3:
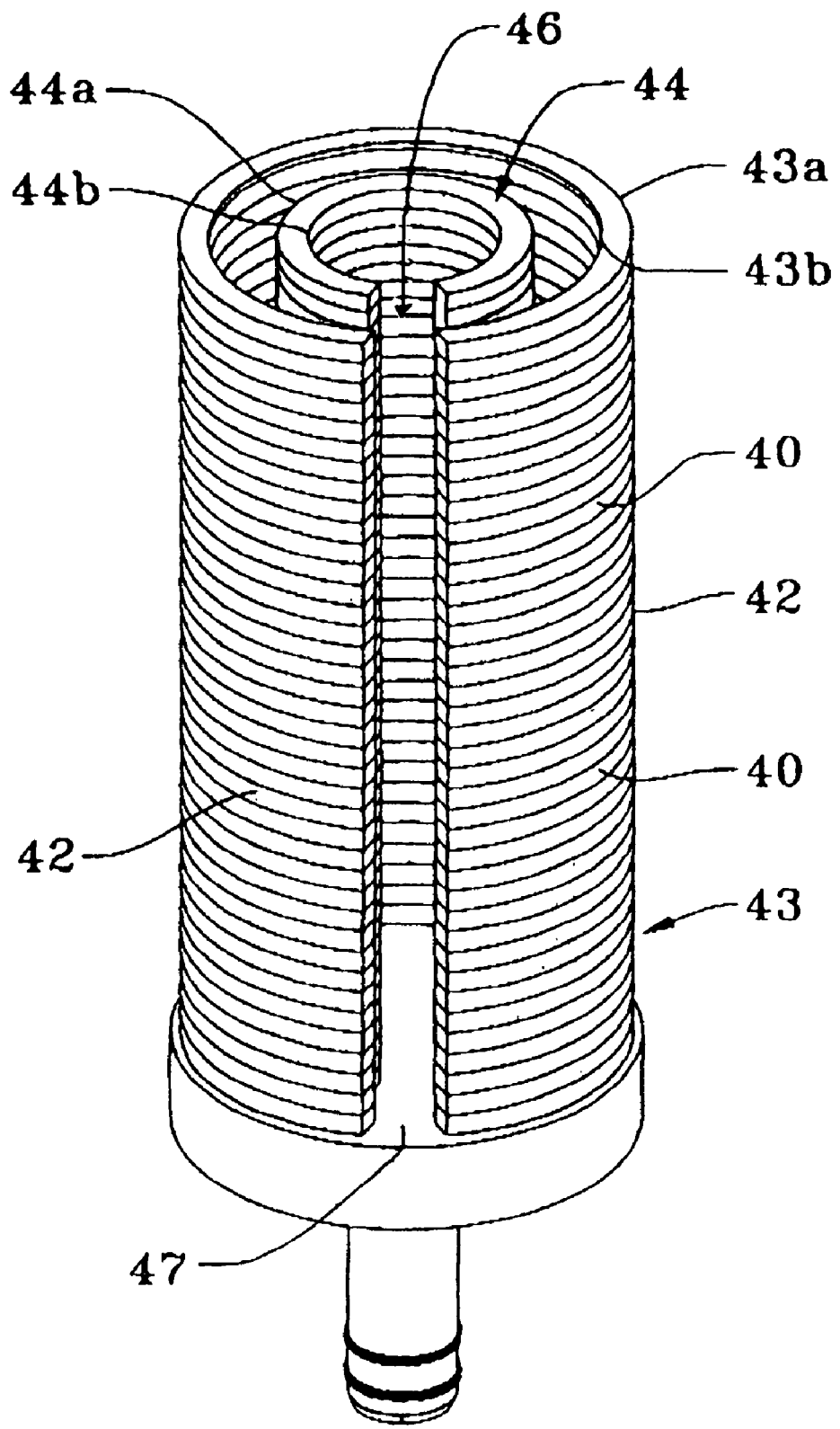
FIG. 3 is a perspective of a construction similar to that of FIG. 2.

FIG. 3 is a perspective of the two-enclosure, substantially concentric, configuration, without the housing 45. Wedge wires form the entire convex (43a and 44a) and concave (43b and 44b) faces of the C-shaped screen units. Slots 42 of the desired dimension are established between wedge wires 40. In the configuration of FIG. 3, C-shaped screen unit 43 is shown with its elongated opening 47 aligned with elongated opening 46 of C-shaped screen unit 44, but this is not essential—that is, screen unit 44 could be turned, for example, 180 degrees so that opening 46 is oriented away from opening 47 of screen unit 43.

Referring now to FIGS. 4 and 5, the top plate 50 of reservoir 51 is seen to have outlets 52 for filtered fluid having passed through the wedge wire screens of screen units 43 and 44. When assembled, housing 45 and the two screen units 43 and 44 are sealed to top plate 50. Filtered fluid collects in reservoir 51 and is removed through pipe 54. A cylindrical screen 55 constructed as in FIG. 1 may reside in the center of inner enclosure 44, providing additional volume for the collection of filtered fluid. FIG. 4 is an exploded view of the top seal 53, screen units 43 and 44, reservoir 51 with its top plate 50, and pipe 54. Housing 45 and the inlet for the dirty fluid are not shown in this view. FIG. 5 is an overhead view of top plate 50, showing the deployment of outlets 52 for screen units 43 and 44.

Figure 6:
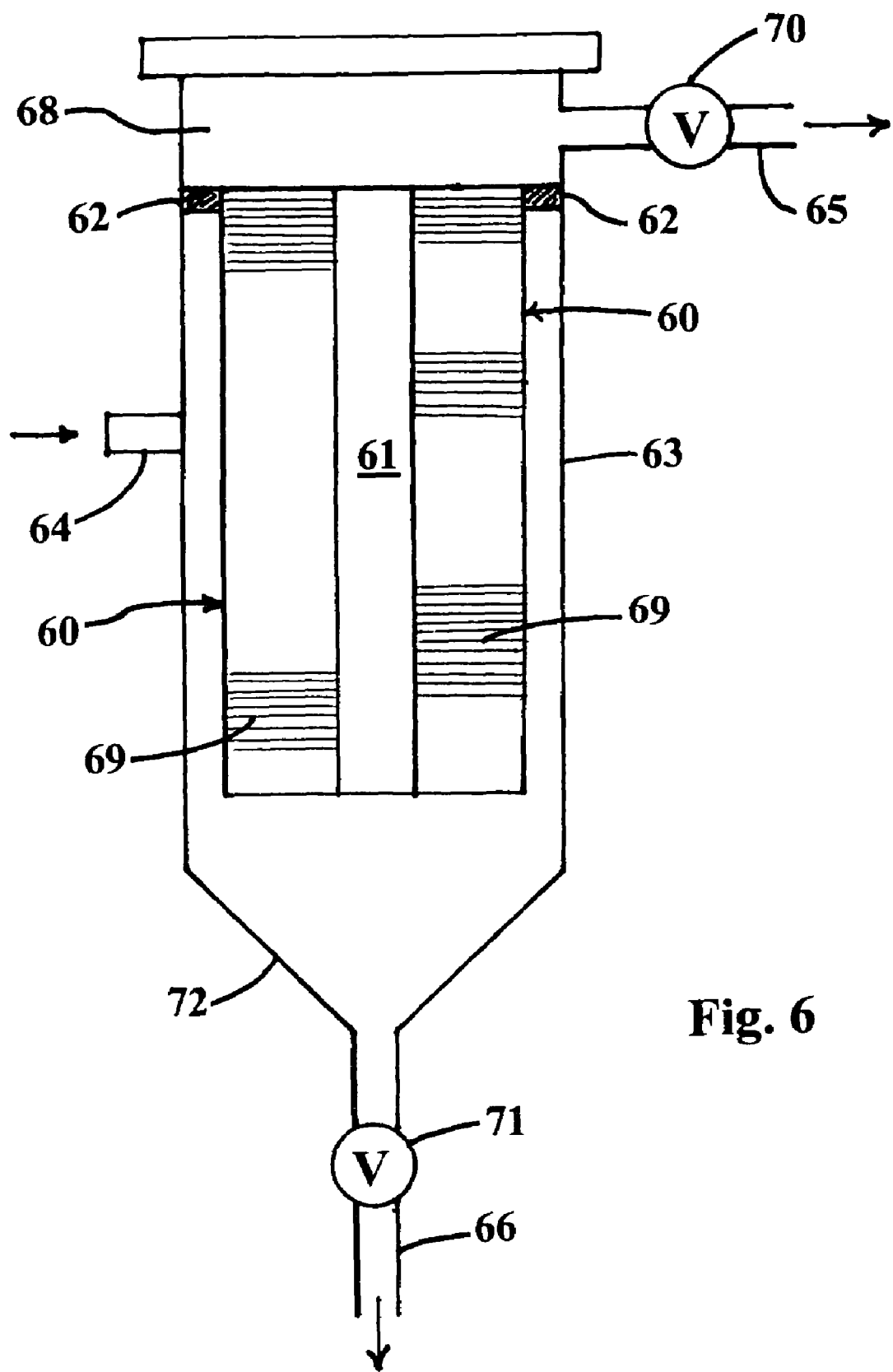
FIG. 6 shows the C-shape screen in the configuration of a candle filter.

FIG. 6 shows the use of my C-shaped wedge wire screen in a candle filter construction, in a more or less diagrammatic fashion. The C-shaped wedge wire screen 60 is viewed from its opening 61. The screen 60, made of wedge wires 69 in a manner similar to that of FIG. 1, is located and fixed next to a ledge 62 near the top of vessel 63. C-shaped wedge wire screen 60 is essentially the same shape and structure as screen unit 43 or 44 in FIG. 2 (having spaces not shown, similar to slots 42 in FIGS. 2 and 3), but here we are looking directly at the opening 61 (equivalent to openings 46 and 47 in FIG. 3), although the screen 60 is entirely enclosed in vessel 63. Vessel 63 has an entrance 64 (which may preferably be oriented toward opening 61) for dirty fluid, an exit 65 for clean fluid, and a drain 66 for solids and concentrated dirty fluid. The lower end 72 of the vessel 63 has a shape similar to a funnel so that solids may collect and drop by gravity to drain 66. The wedge wire screen 60 is constructed in a sense opposite to that of FIG. 4 in that the clear filtered fluid is taken off the top and sent through exit 65 instead of through the bottom; solids and dirty fluid exit in the bottom. For these purposes, it should be noted that the top of wedge wire screen 60 may be completely open to the clean fluid collection chamber 68; on the other hand, the bottom of the wedge wire screen 60 should either be sealed or closed off with a screen material, so that solids and dirty water will not enter the wedge wire screen 60 from the bottom. Valves 70 and 71 may be used to control the flow out of the vessel 63.

A screen such as depicted in FIGS. 1-6, or any other effective screen, may advantageously be placed immediately upstream of a viscometer to protect the viscometer from solids, or just ahead of a filter, to remove solids larger than the filter is designed for. In addition to removing potentially damaging solids, the wedge wire screen can perform the function of breaking up "fish-eyes" or other localized gel blobs, as well as shearing a viscous fluid, sometimes delaying the point at which the fluid is diverted or at which the pump is shut down.

The invention claimed is:

1. A solids/liquid separator comprising a first generally cylindrical screen having a screen surface facing outwardly, said screen surface comprising flat surfaces of wedge wires, a second generally cylindrical screen of a diameter smaller than that of said first screen and having a screen surface facing inwardly, said screen surface comprising flat surfaces of wedge wires, said second screen being situated substantially concentrically within said first screen, said first and second screens being connected in sealed relation to form a generally C-shaped profile and a space between said first and said second screens for collecting liquid filtrate, and means for (i) causing solids containing liquid to flow in contact with said flat surfaces of wedge wires on both of said first and second screen surfaces to form said liquid filtrate in said space and (ii) removing said liquid filtrate from said space.

2. A separator of claim 1 wherein said first and second screens are wedge wire screens.

3. A separator of claim 1 including a second separator of claim 1 within the C-shaped profile of said separator of claim 1.

4. A separator of claim 3 wherein said first and second separators comprise wedge wire screens.

5. A high volume separator comprising a plurality of separators of claim 1.

6. The separator of claim 1 including a substantially cylindrical wedge wire screen within and substantially concentric to said generally C-shaped profile.

7. A substantially cylindrical device for separating solids and liquids, said substantially cylindrical device having a C-shaped cross section, comprising (a) a substantially cylindrical convex wedge wire screen, the outer surface of said substantially cylindrical convex wedge wire screen comprising flat surfaces of wedge wires, (b) a substantially cylindrical concave wedge wire screen, the concave surface of said substantially cylindrical concave wedge wire screen comprising flat surfaces of wedge wires, said substantially cylindrical concave wedge wire screen being fixed and sealed substantially concentrically within and apart from said substantially cylindrical convex wedge wire screen, whereby said convex and concave screens form an interior space, and (c) an outlet from said space for removing liquid separated from said solids, said liquid being separated from said solids by both said convex and said concave wedge wire screens.

* * * * *